US008328635B2

(12) United States Patent

Oosthoek

(10) Patent No.: US 8,328,635 B2
(45) Date of Patent: Dec. 11, 2012

(54) SYSTEM AND METHOD FOR REWARDING PLAYERS BASED ON PERSONAL INTERESTS OR ATTRIBUTES

(75) Inventor: Jeroen Oosthoek, Coloane (HK)

(73) Assignee: IGT, Reno, NV (US)

(*) Notice: Subject to any disclaimer, the term of this patent is extended or adjusted under 35 U.S.C. 154(b) by 620 days.

(21) Appl. No.: 11/520,452

(22) Filed: Sep. 13, 2006

(65) Prior Publication Data

US 2008/0064492 A1 Mar. 13, 2008

(51) Int. Cl.
*G06F 17/40* (2006.01)

(52) U.S. Cl. ................. 463/26; 463/27; 463/30; 463/40

(58) Field of Classification Search .................... 463/28, 463/25, 20, 42, 26, 27, 30, 40
See application file for complete search history.

(56) References Cited

U.S. PATENT DOCUMENTS 4,842,276 A * 6/1989 Darby ............................. 463/22
5,280,909 A 1/1994 Tracy
5,655,961 A 8/1997 Acres et al.
5,702,304 A 12/1997 Acres et al.
5,741,183 A 4/1998 Acres et al.
5,752,882 A 5/1998 Acres et al.
5,820,459 A 10/1998 Acres et al.
5,836,817 A 11/1998 Acres et al.
5,876,284 A 3/1999 Acres et al.
6,065,753 A 5/2000 Morosky
6,110,043 A 8/2000 Olsen
6,146,273 A 11/2000 Olsen
6,162,122 A 12/2000 Acres et al.
6,217,448 B1 4/2001 Olsen
6,231,445 B1 5/2001 Acres
6,244,958 B1 6/2001 Acres
6,254,483 B1 7/2001 Acres
6,257,981 B1 7/2001 Acres et al.
6,312,233 B1 11/2001 Ahn et al.
6,319,125 B1 11/2001 Acres
6,358,149 B1 3/2002 Schneider et al.
6,364,768 B1 4/2002 Acres et al.
6,371,484 B1 4/2002 Yuan
6,371,852 B1 4/2002 Acres
6,375,567 B1 4/2002 Acres
6,431,983 B2 8/2002 Acres
RE37,885 E 10/2002 Acres et al.
6,565,434 B1 5/2003 Acres
6,575,832 B1 6/2003 Manfredi et al.
6,607,441 B1 8/2003 Acres
6,656,048 B2 12/2003 Olsen
6,712,697 B2 3/2004 Acres
6,758,749 B2 7/2004 Krintzman
(Continued)

*Primary Examiner* — Dmitry Suhol
*Assistant Examiner* — Brandon Gray
(74) *Attorney, Agent, or Firm* — Clise, Billion & Cyr, P.A.

(57) ABSTRACT

A system and method for rewarding players of wagering game with a bonus is disclosed. A database is provided for collecting and storing personal interest information from two or more players. The database comprises data fields each representing a category of personal interest information. A player tracking server is utilized to monitor the player's gaming activity. A bonus server operates in conjunction with the gaming server to determine when a bonus is to be awarded to one or more players. A player qualifies for a share of the bonus based on the common personal interest information as compared to the player that triggered the bonus award. The bonus may be shared equally or unequally by players who qualify to receive the bonus.

24 Claims, 5 Drawing Sheets

U.S. PATENT DOCUMENTS

| | | | | |
|---|---|---|---|---|
| 6,793,577 | B1 | 9/2004 | Wilkins et al. | |
| 6,800,030 | B2 | 10/2004 | Acres | |
| 6,832,956 | B1 | 12/2004 | Boyd et al. | |
| 6,832,958 | B2 * | 12/2004 | Acres et al. | 463/25 |
| 6,860,811 | B1 | 3/2005 | Wilkins | |
| 6,878,063 | B2 | 4/2005 | Manfredi et al. | |
| 6,910,964 | B2 | 6/2005 | Acres | |
| RE38,812 | E | 10/2005 | Acres et al. | |
| 7,033,272 | B1 | 4/2006 | Mason | |
| 7,048,628 | B2 | 5/2006 | Schneider | |
| 7,056,212 | B2 | 6/2006 | Boyd et al. | |
| 2003/0078101 | A1 | 4/2003 | Schneider et al. | |
| 2003/0224852 | A1 * | 12/2003 | Walker et al. | 463/20 |
| 2004/0242303 | A1 * | 12/2004 | Walker et al. | 463/16 |
| 2005/0153768 | A1 | 7/2005 | Paulsen | |
| 2005/0153773 | A1 | 7/2005 | Nguyen et al. | |
| 2006/0080175 | A1 * | 4/2006 | Rowe et al. | 705/14 |

* cited by examiner

SYSTEM AND METHOD FOR REWARDING PLAYERS BASED ON PERSONAL INTERESTS OR ATTRIBUTES

1. FIELD OF THE INVENTION

The present invention relates to the gaming industry and, in particular, to a system and method for rewarding casino players based on personal interest information of one or more casino players.

2. BACKGROUND OF THE INVENTION

The gaming industry continues to grow fueled in part by the increasing popularity of gaming machines, such as slot-type machines, video poker and video keno. As is known in the art, these gaming machines initially receive a monetary wager from players, followed by instructional input in the form of pressing a button or pulling a lever arm. The player either wins or loses in accordance with the rules of the particular game. When the player wins, he or she directly receives a reward, primarily in the form of a monetary return dependent on the amount bet on that particular game.

Even with the continued boom in popularity, casino operators are continually seeking for ways to maintain a player's interest as well as attract new customers. One method developed by casino operators to increase interest is to provide a player the opportunity to win a bonus that can amount to a very large sum of money, or perhaps be an expensive item such as an automobile. In addition, bonuses, such as mystery bonuses or progressive jackpots, are offered, with increasing frequency, to players of table games. However, it is still much more common to offer bonuses in conjunction with play on gaming machines.

One approach that casino operators use to implement a progressive bonus has involves linking of individual gaming machines together to allow players to compete for a common jackpot that can build rapidly. The casino operator typically has a control system that communicates with the linked machines and keeps track of the bets received on each machine as well as machine identification information. In one progressive application, the bets on the linked machines increment a pool finding the jackpot that continues to increase until a threshold value, which may be preprogrammed or randomly generated, is reached.

When a bet increment causes the jackpot pool to reach the threshold value, a random number generator generally determines which among the linked machines triggers the bonus award. The award is communicated to the winning gaming machine and the jackpot win amount is made to the player playing that machine. This set-up is an example of machine eligibility for the mystery progressive jackpot.

Casino operators have also implemented player tracking programs that have proven to be quite popular with casino players. These programs customarily provide awards to players based on the player's level of gaming activity. The awards are generally known in the art as comps and comprise free meals, free merchandise, free entertainment and/or free lodging which are designed to entice the player to increase play.

The player tracking programs are implemented by gathering player name from the player to link a player tracking card to the player. The tracking card uniquely identifies that player and acts in conjunction with the casino operator's control system to monitor the player. In use, the player tracking card is inserted into the gaming machine at the time of play and is read by a card reader associated with the gaming machine. For players of table games, the player tracking card is typically given to casino personnel who enter information at a workstation in the pit area where the table game is located. The information is processed by the casino operator's control system to identify the player and allow for the tracking of his or her play.

Whiles these various features have enhanced the gaming experience to the player, many prior art games and systems require the player to receive a particular game or be a bonus winner, such as through random selection, to receive credits. Thus, although the player may have wagered significant money, prior art games liked winning to an individual's ability to obtain a particular game outcome (i.e. a certain set of pay symbols on a line on a slot machine or a poker hand like four of a kind on a video poker machine) or the outcome of a mystery progressive jackpot. This format reduces number of opportunities a player has to win an award and reduces the social aspect of the gaming since, in essence, it is always the player alone, against the house or machine. To overcome some of these format limitations, and to further enhance the interest of casino players a new format of award presentation is disclosed herein

SUMMARY OF THE INVENTION

The advantages and other novel features of the invention will be set forth in part in the description that follows and in part will become apparent to those skilled in the art upon examination of the following or may be learned with the practice of the invention.

To achieve the foregoing, and in accordance with the disclosure that follows, a system for rewarding casino players is provided. In one embodiment, the system comprises a database for collecting and storing personal interest information of casino players. To implement the system, the casino operator issues an identification element, generally referred to as a tracking card, to each of the casino players. The casino players use tracking cards when participating in gaming activity in order to qualify for awards based on the level of play. In the context of play on gaming machines, the tracking card is typically inserted into a card reader associated with the machine, which communicates signals to other components of the casino's control operation. The system further includes a server, responsive to an input or reader device, for monitoring and tracking both the gaming activity of a casino player and the player's location within the casino. It is contemplated that the tracking server and a gaming server work in unison to promote the advantages of the present invention. The tracking server may be configured to facilitate registration of players and track play of registered players. In one example embodiment the game server generate games outcomes, which may be communicated to the gaming machines. It is contemplated that a game server may or may not be utilized depending on the configuration of the system. In the context of a player playing on a gaming machine, the joint operation of the tracking server and/or the gaming server allows the casino to recognize that a player is currently playing in the casino, either at a machine based game or a table game.

It is further contemplated that the system may include a bonus server that is configured to determine when a player is going to or has hit an award which could be a bonus or a jackpot (a prize larger than a bonus which could include a progressive jackpot). The award may include, without limitation, a mystery progressive jackpot. The award may be attributed to the gaming device or paid by casino staff. The granting of such an extra award has proven to be an effective means of stimulating the interest of players and motivating them to increase their level of play.

Advantageously, the bonus server is configured to cooperate with the database of personal interest information to share the bonus award with one or more additional players based on the personal interest information. It is contemplated that this aspect of the present invention adds an additional level of excitement to the awarding of bonuses to players or other parties who did not trigger the award.

One embodiment of the player reward system contemplates that the database is comprised of fields, each field representing a category of personal interest information that is collected from players. Each data field includes the names of one or more players having the personal interest information defined by the data field. The term player as used herein is defined to mean active players or other parties who are not wagering. For purposes of this invention, the definition of personal interest information includes, without limitation, personal attributes, personal qualities, personal characteristics and personal choice or favorite items. The number of fields that represent categories of personal interest information in the database is unlimited. They may include, without limitation, the player's age or age range, gender, profession, residence location, nationality, hobbies and favorite things like color and sports teams, favorite restaurant/food, favorite holiday or vacation destination, among many others. By maintaining this information in fields in the database representing categories of personal interest information, the casino operator can identify group of players that have common interests and/or attributes. Awards may be shared among players with common personal interest information.

In one aspect of the invention, a unique data field can be created by one or more players to be in the nature of a team. With this opportunity, the group of casino players within a data field that may qualify for a bonus award may be intentionally and selectively created rather than indiscriminately established.

In one embodiment of the invention, the award of the bonus is determined in a non-random fashion. Thus, if the casino operator organizes a promotional event, the system of the present invention can be designed to award a bonus in conjunction with the promotional event. Alternatively, system may be configured to award a bonus at a random time.

In one aspect of the invention, the determination of the award to one or more players included within a specific data field occurs in a non-random fashion. As described above, the casino operator can thus set the system of the present invention to award an award to a particular group of players that may be the target of a casino promotion. An alternative embodiment contemplates that the determination of the award to one or more players in a data field occurs in random fashion. It should be remembered that as mentioned above, the award may be shared based, either solely or partially, on personal interest information that defines the various data fields.

In the circumstance of an award being triggered, it is thus recognized that the award may be shared by those in the data field qualifying for an award. In alternative embodiments, the amounts awarded in this circumstance may be shared equally by the players within the qualifying data field, or unequally, with the player triggering the award of the bonus being awarded a greater portion of the award amount. When the triggering player is awarded a greater portion of the award amount, other players in the qualifying data field may equally share in the remaining portion of the award amount.

It is further contemplated that the player reward system may be configured to differentiate between those players in a data field qualifying for an award who are playing at the time that the award is awarded and those players in that qualifying data field who are not playing at the time that the bonus is awarded. In circumstances where players in a qualifying data field are to share in a bonus award, the player reward system may be configured to award a portion of the bonus amount to all players in the qualifying data field, regardless of whether they are at the casino and playing when the bonus server is triggered. Alternatively, system may be configured to award a portion of the award only to players who are playing at the time the bonus server is triggered.

In one embodiment of the invention, the bonus pool for the bonus to be awarded to casino players in accordance with the operation of the reward system is funded by the gaming activity of those players within the qualifying data field for which the bonus is to be awarded. Alternatively, the bonus pool may be funded independently of any play by those players within the qualifying data field.

The present invention further contemplates a method for rewarding casino players with a bonus. In one embodiment, the method comprises collecting and storing personal interest information of players in a database. The method further contemplates establishing and building a bonus fund for awarding to one or more casino players.

The method additionally comprises the step of determining when the bonus is to be awarded to one or more casino players. In an important aspect of the method of the present invention, the bonus is awarded to players based on one or more categories of personal interest information in the database. The method provides an incentive for players to increase their gaming activity by promoting a sharing of bonus awards among players that have common interests and/or attributes.

The types of equipment that are used to practice the method of the invention are described above. In addition, the types of personal interest information that are used to create data fields in the database are also described above.

Other advantages of the present invention will become apparent to those skilled in this art from the following description where there is shown and described one or more preferred embodiments of this invention, simply by way of the figures. As will be realized, the invention is capable of other different embodiments and its several details are capable of modification in various aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrates several aspects of the present invention and together with the description serves to explain the principles of the invention. In the drawings.

DETAILED DESCRIPTION OF THE INVENTION

Figure 1:
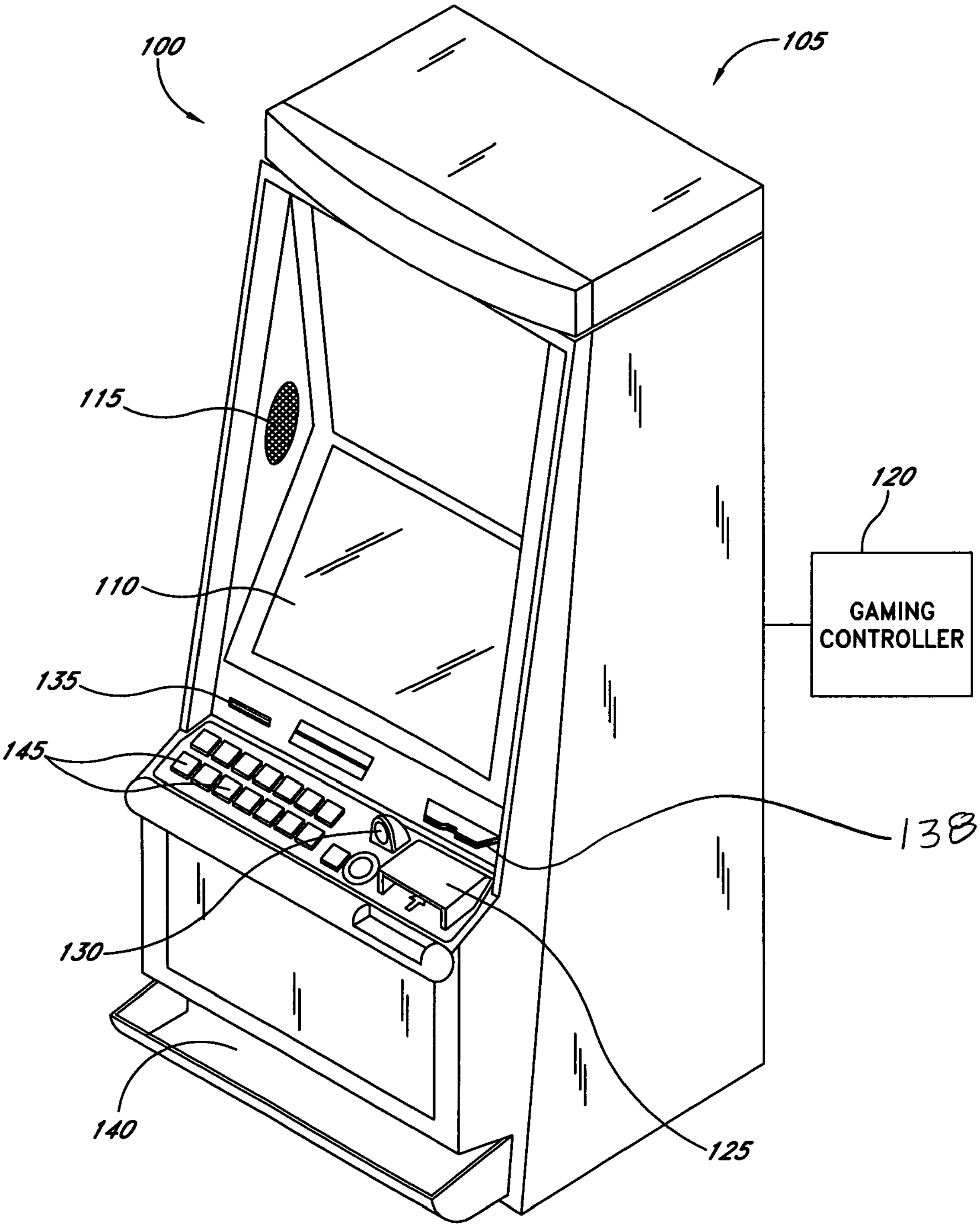
FIG. 1 is a perspective view of a gaming machine that may be utilized to implement the system of the present invention.

Traditionally when offering bonuses such as mystery progressive jackpots and other mystery bonuses, a casino operator has configured the control system to trigger the award based on a particular hand, on a time basis, or a coin-in basis. For example, with regard to a time basis, a control system may require a particular game outcome or a coin in amount for a machine, or set of linked machines, before the machine or set of linked machines may award a bonus. Alternatively, the control system may establish a jackpot hit for a machine, or set of linked machines, at a random time.

A similar circumstance transpires when a bonus is awarded with respect to play at table games. Typically, coin slots or RFID (radio frequency identification) enable tokens are utilized for table players to place a wager which is directed toward qualification for a bonus. The control system may be set up to award the bonus on a time basis or coin-in basis as described above. Upon reaching the time threshold or monetary threshold for play at the table or set of linked tables, the random number generator is engaged to trigger the award to a randomly selected player.

This approach can broadly be described as "location eligibility", or perhaps more directly as "table eligibility" and "machine eligibility". Stated another way, the award of the bonus is to the table coin slot or the machine, regardless of who may be playing at the moment that the award is triggered and without any regard to any attribute of that particular player. In addition, the award is provided to only the player that triggered the award.

The present invention changes that approach by allowing players to qualify for the award of a bonus based that player's personal interests or attributes. This may be described as making a bonus available based on player eligibility, either instead of or in conjunction with location eligibility or one or more other qualifying factors.

Reference is now made to the figures illustrating the operable aspects of a casino player reward system. It should be noted that this is but one example embodiment and other embodiments which do not depart from the scope of the invention may be enabled. In addition, the various features described herein may be enabled alone or in combination. For instance, the casino player reward system may be implemented in a wireless operating environment, or alternatively, the functional components may be connected through conventional communication paths.

The casino player reward system may also be operated in conjunction with an in game sports wagering system such as Progressive Gaming International Corporation's® Rapid Bet Live™ system. The player makes wagers on events during a football game such as whether a particular possession of the football will result in a touch down. A mystery progressive jackpot could be shared by fans of the same team as the player who won the mystery progressive jackpot. For example, if the Bonus Server picks a player whose favorite team is the New York Jets then all players who are New York Jets fans would split a portion of the mystery progressive jackpot.

One example embodiment of the player reward system is advantageously implemented to reward players playing a gaming machine, such as the machine identified as 100 in FIG. 1. It is contemplated that the player reward system may be applied to numerous different wagering events such as table games, keno, sports betting, pari-mutual horse racing, and mobile gaming.

The gaming machine 100 includes a housing 105 for enclosing and supporting various components of the gaming machine. The gaming machine 100 includes a display screen 110 for displaying images related to the game being played. The images presented on the display screen 110 typically include playing cards, alphanumeric characters, and/or spinning reels with pictorial representations. It can be appreciated, however, that many other types of images may be presented on the display screen 110, including text and images relating to the operation of the present invention as will be more fully described below.

In addition to images being presented on the display screen 110, components such as speakers 115 may be provided for generating sound associated with the game. The speakers 115 may also be used to present audio messages to the player of the gaming machine 100. The audio components of the gaming machine 100 may also be utilized in the casino player reward system as will be described below.

As is known in the art, also among the components enclosed within the housing 105 may be electronic elements that facilitate the playing of the gaming machine 100. More particularly, a gaming controller 120 supported within the housing 105 may manage and control the presentation of the game or games playable on the machine. Alternatively, the gaming controller 120 may communicate with other components such as a master server that may be configured to control and provide game data to a plurality of gaming machines 100 throughout the casino. The gaming machine 100 may be of a variety of types and be arranged to present one or more different types of games to a player. For example, the gaming machine 100 may comprise the well-known slot machine or video poker machine, or any other type of gaming device.

In the casino environment, the gaming controller 120 may be configured to generate video and audio data for presentation by the display screen 110 and speakers 115 of the gaming machine 100. Furthermore, the gaming controller 120 may facilitate the operation of the gaming machine 100 within a network of related machines, and may transmit and receive game information to and from remote locations, such as a central server location.

The gaming machine 100 illustrated in FIG. 1 is generally used by a player for wagering on a game outcome. In order to accept a wager from a player and to initiate a game, the gaming machine 100 may include a bill or ticket validator/acceptor 125 for receiving paper currency. The gaming machine 100 may also incorporate a coin acceptor 130 for accepting coins. Other means of payment, such as credit cards and money vouchers may be utilized. An award of winnings may be paid to the player in various forms, such as a money voucher that may be printed by the gaming machine 100 and presented through a voucher slot 135, or alternatively in the form of coins dispensed via a coin tray 140.

Preferably, the gaming machine 100 includes interface elements for a player to provide input. In one embodiment, the interface elements comprise one or more buttons 145. More particularly, the player may use the buttons 145 to provide various play instructions, such as which among the various games offered he or she chooses to play. In addition, the buttons 145 may be provided for the player to select the amount to bet on a specific game. When a game of video poker, for example, is played on the gaming machine 100, the buttons 145 may be provided for permitting a player to hold or select cards in a hand. The buttons 145 may also permit a player to indicate that he or she wishes the game to start or to draw replacement cards.

Also part of the example gaming machine 100 shown in FIG. 1 is a player tracking system 138, which in this example embodiment is configured as a player tracking card reader. The system 138 is capable of receiving player data which identifies the player at the machine or other wagering event, such as a table game. The reader may have associated keypad and screen to allow for the exchange of information. The player tracking system 138 communicates player data to a server, as is understood in the art, thereby allowing the server to track which players are currently engaged in wagering.

It will be appreciated that the gaming machine 100 may have a variety of configurations, and that gaming machine illustrated and described above is but an example of a device for implementing one or more games for presentation to a player.

Figure 2:
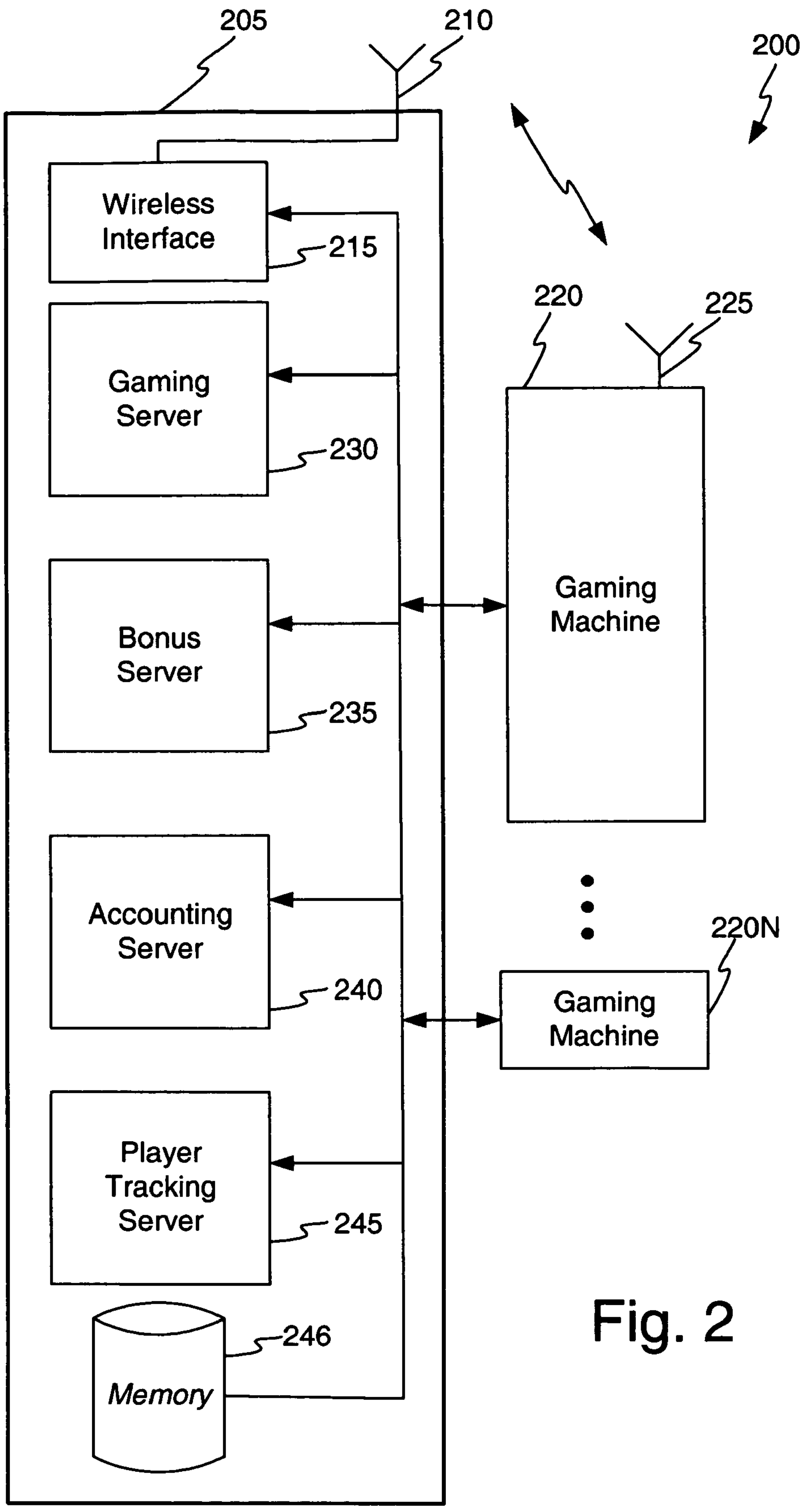
FIG. 2 is a block diagram of an example embodiment of a game network configured as a player reward system.

As illustrated in FIG. 2, a gaming network, identified in its broadest aspects as 200, may be configured to communicate and optionally control one or more gaming machines 220-220N, where N is any whole number. Remotely located from the gaming machine is a master server 205, which is shown and described generally as one or more processors and one or more memories. The master server 205 may communicate with the gaming machine 220 either via a wireless link or a hard-wired/optical connection.

In accordance with operation in a wireless environment, the master server 205 includes an antenna 210 which connects to a wireless interface 215. The antenna 210 and wireless interface 215 operate together to send and receive signals transmitted to and from a remote location. As is known in the art, the wireless interface 215 may also operate to demodulate, decode and otherwise process information to and from remote locations. Wire/optic communication systems are well known in the art and hence not described in detail.

The master server 205 may comprise any type of computer system capable of storing data and providing data to one or more users over a network. Furthermore, as is known in the art, the master server 205 may also perform processing operations. As is more fully described below, the master server 205 includes one or more database systems that store data regarding, among other types, player identification, player gaming activity and personal interest and/or preference information of casino players.

The master server 205 may communicate in this operational embodiment with one or more gaming machines. As mentioned above, it is contemplated that the master server 205 may communicate with these various locations either through wired or wireless communication. When using wireless communication, any type of standard or protocol such as Mohitex, Ardis IEEE 802.11, UMTS, GPRS, IS-95, AMPS and/or Bluetooth may be used to implement the communication. Any type of wireless transmission may be implemented as well, including but not limited to optical, electromagnetic energy, radio or other frequency communication and infra-red-type communications.

The gaming machines 220, 220N illustrated in FIG. 2 may correspond to the types of machines identified as 100 in FIG. 1. It is further contemplated for those players that prefer to play table games that the master server 205 may communicate with workstations in the pit area where table games are located, the table themselves, or player stations associated with players at table game. It also contemplated that the gaming machine 220 may comprise a wireless gaming device. Thus, it is contemplated that communication occurs between the master server 205 and any location within the casino where players are allowed by gaming regulations to participate in gaming activity and any type machine or wagering event may be linked.

The master server 205 may incorporate a plurality of component servers that facilitate the operation of the gaming network 200. More particularly, a gaming server 230 may be configured to manage and control the operation of the gaming machines 220. The gaming server 230 may include database systems that store and transmit game outcomes relating to the individual games played on a gaming machine 220 or, alternatively, simply be programmed to determine a winning game outcome and/or an appropriate payout. Such an environment may be referred to as a central server system.

A bonus server 235 may be incorporated into the master server 205 and may cooperate with the gaming server 230 to allow a player to participate in jackpot games and/or qualify for awards, promotions and/or goods and services, referred to as comps, based on the level of the player's gaming activity. The gaming server 230 and bonus server 235 may operate in unison to determine when a player passes a threshold to qualify for a bonus, jackpot, promotion, award or comp. Examples of these types of awards include, but are not limited to, mystery bonuses and progressive jackpots. The bonus server may also stored one or more player preferences, personal interests or attributes. Other important operations of the bonus server 235 in the context of the present invention are set out below.

An accounting server 240 may be provided to receive, store and transmit information relating to a player's account. While not shown in FIG. 2, additional component servers may be incorporated into the master server 205 to perform other functions. The accounting server may be configured to store award amounts or running totals associated with particular groups or categories of player preferences, interests or attributes. An administrative server may track expenditures by a player during his or her visit to the casino. In addition, a concierge server (not shown) may be provided to assist in making reservations at restaurants and purchasing tickets for entertainment events.

In one embodiment of the casino player reward system 200, the master server 205 further comprise a player tracking server 245 that may provide a number of important functions. The player tracking server 245 plays an important part in the operation of the casino player reward system 200 of the present invention as will be described in more detail. It is contemplated that the player tracking server 245, the bonus server 235 and the gaming server 230 cooperate with one another to promote the goals of the casino player reward system 200. A memory 246, configured as a database, is also provided to store any type data or information.

One potential function of the player tracking server 245 is to assist in determining the location of a player within the casino. The player tracking server 245 may be configured with a database that includes the location of all gaming machines and gaming tables within the casino. The player tracking server 245 may also be configured with other locating means such as GPS elements, to facilitate other location operations.

One example of how the player tracking server 245 generates player location data is through use of a player tracking system. Typically, in order to take advantage of a casino operator's reward program, players sign up or register to join the program. In doing so, they provide basic identification information. The casino operator issues an identification element, such as a plastic card generally referred to as a player reward/tracking card, that is encoded with identifying information about the player. The player reward/tracking card is a readable element that cooperates with an input or reader device, such as a card reader or radio frequency identification (RFID) reader associated with a gaming machine or as a stand alone element. Players utilize the player reward/tracking card and the reading element at the gaming machine or gaming table reads the player data on the card and conveys the data to player tracking server 245. Given that the player tracking server 245 may correlate machine or table location to reader number, the player tracking server 245 may maintain a location database regarding the location within the casino of each player.

It is also contemplated that the machines and/or tables may be physically arranged to group players of a particular group into a particular location in the casino or in close proximity. For example, by placing football themed games together players interested in football may then play in close proximity. When a player wins the shared award, the other players that may also share in the award, if they are in the same player group, such as the same favorite football team, would also be notified and a group celebration may occur. This builds team spirit and encourages others to win for their team of player group members who share a common team. Players sharing in the award may also congratulate the player who triggered the shared award.

In a central server environment, the game server or other central server may selectively configure machines to offer themed games to attract players which are in a common player group. In addition, only select machines may be eligible to participate in the shared award as described herein, which may provided another method to group players playing for the shared award.

A hierarchy may also be established in the form of location which offer shared award opportunity. The hierarchy may be sites (such as casinos), areas with sites, and machines within sites.

In addition to the above-described function of the player tracking server 245 in storing basic identification information of players, it is contemplated that the player tracking server may also store personal interest information provided by the players upon initial registration. Thus, when the player uses his or her player reward/tracking card, not only is it read to identify the customer and possibly to locate the customer within the casino at a machine, but it also provides the link to personal interest information (defined broadly to mean personal attribute information, personal interest information, and personal preference information). As discussed below in more detail, the personal interest information may be used to determine whether the player qualifies to receive a bonus award. The personal information is described below in more detail.

As is known in the art, casino operators use bonus awards to increase interest among the players patronizing their establishments. Awards such as mystery bonuses and progressive jackpots are commonly offered to players of gaming machines. Casino operators have also instituted bonus awards to those casino players that prefer table games. It is also possible on table games for players to place a side wager in addition to their conventional wager on the particular game being played. The awards from side wagers for table game play are typically funded by the special side wagers on table games. In one embodiment the side wager may fund the shared bonus award and winners of the side wager may trigger the grant of the shared award.

Awards associated with the play of gaming machines may likewise be funded by a portion of each bet made on a specific play of the machine. Awards for both table game play and gaming machine play may alternatively be funded by the casino operator with separate monies dedicated specifically for awards which can be bonuses or jackpots and/or originating from a source such as a promotion fund. It is contemplated that the bonus server 235, as described above, may manage and control the award of a bonus or jackpot in accordance with the operation of the player reward system 200 of the present invention. More particularly, the bonus server 235 may be programmed to award a bonus or jackpot for a gaming machine or a table game on a coin-in or a time basis. It can be appreciated that the manner in which the payout can be made can take a variety of forms. More specifically, cash may be distributed directly to the player, either in the form of currency or a money voucher. The casino operator may choose to assign credits or points equivalent to the value of the bonus or jackpot to the player's gaming account. Alternatively, the player may be awarded merchandise or services equivalent to the value of the bonus or jackpot. Awards may be provided to a player upon receipt of a particular game outcome, or randomly, such as a mystery Jackpot®.

In addition, the bonus server 235 may be configured to establish a monetary threshold or a time threshold of betting activity for a particular gaming machine or table game that must be reached before a bonus or jackpot is awarded. Once that threshold is reached, a random number generator operates to determine the precise moment that a bonus or jackpot is to be awarded.

As described above, heretofore, the eligibility of a player for the award of a mystery Jackpot®, in the context of play on a gaming machine, has been determined solely and exclusively by the player playing a triggering machine. Thus, in certain awards of bonuses or jackpots, there is no other factor for a player being awarded a bonus or jackpot beyond the luck and good fortune of sitting at the gaming machine at that specific time. In addition, only the player who triggered the mystery or progressive would receive the award.

The player reward system of the present invention adds excitement to the award of a bonus or jackpot by making a player eligible for a bonus based on the personal interest information supplied by the player to the casino operator. In one embodiment, a player may be eligible for an award based on only the personal interest information.

Personal Interest Information

Personal interest information as used herein includes, but is not limited to, personal attributes, characteristics, personal interests or favorite items as identified by a player. More specifically, the casino operator may establish a database that includes not only basic player identification information, but also other items of personal interest, personal characteristics, or personal preferences or for players. The term personal interest information should be construed broadly to cover personal interest, personal characteristics, or personal preferences. It is further contemplated that the amount and types of personal interest information is unlimited and thus a reward system may be established that creates eligibility for the player to receive an award based on any one or more of a great number of factors.

Figure 3:
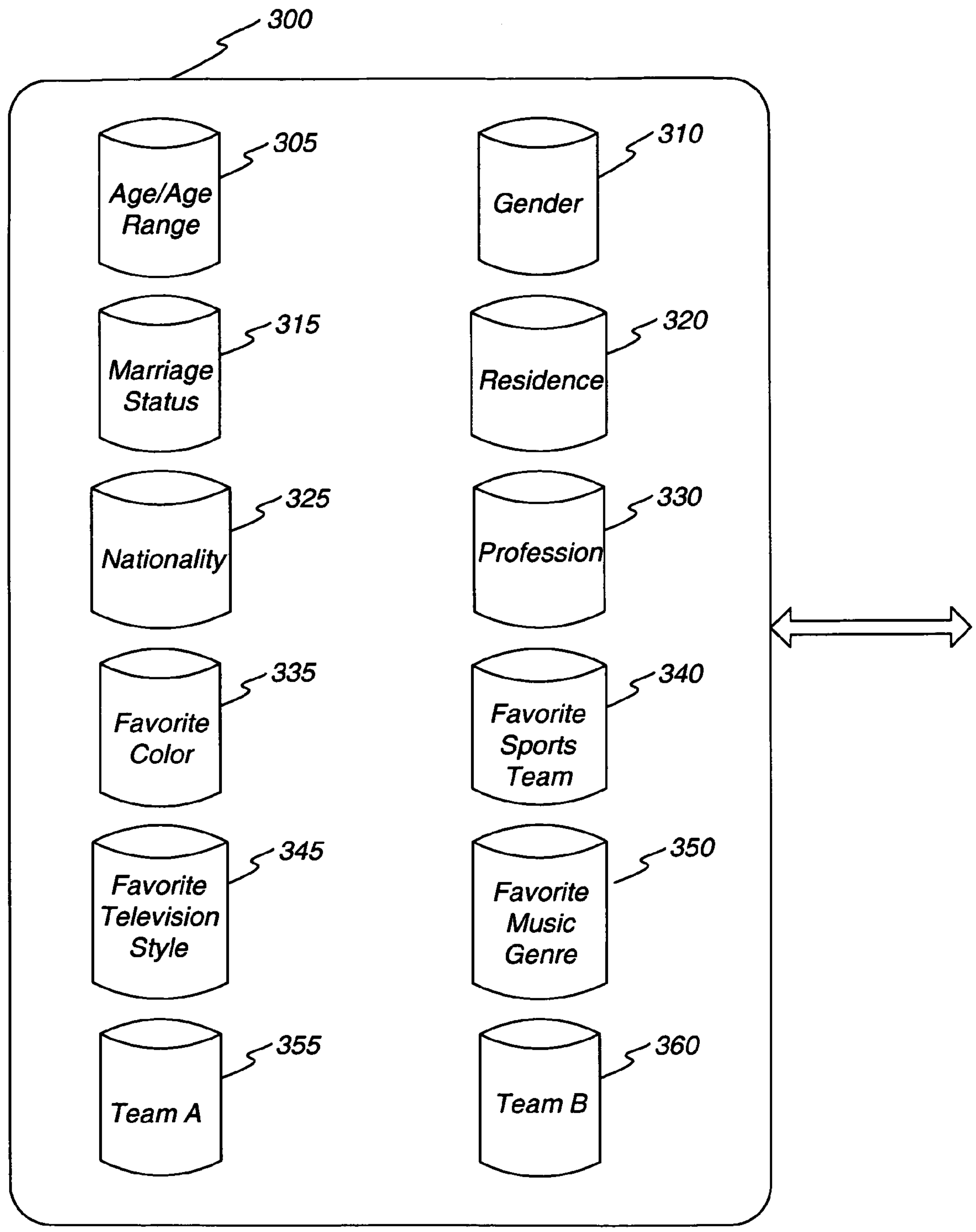
FIG. 3 is a block diagram illustrating data fields in a player reward system which represent various categories of personal interest information.

As shown in FIG. 3, the database 300 established for the player reward system of the present invention comprises individual data fields that define categories of personal interest information. The data fields or databases are used by the player reward system of the present invention to determine eligibility of a player to receive a bonus. The data fields illustrated in FIG. 3 are not intended to be exhaustive, but merely to be representative of various types of personal interest information that can establish eligibility for the receipt of a bonus award. As discussed herein, the players associated with a common personal interest category may be referred to as player groups.

The data fields may include age or age range 305, gender 310, marriage status 315, residence 320, nationality 325 and profession 330, among other attributes, traits and characteristics. In addition, other forms of personal interest information such as favorite color 335, favorite sports team 340, favorite television programming 345 and favorite music genre 350 or band, among many others, may be used to define data fields in the database that the reward system may determine to qualify for the award of a bonus. It also contemplated that additional personal interest information categories may comprise, but are not limited do, sex, race, hair color, height, weight, astrological sign, favorite sport, favorite sports team, favorite restaurant and/or food, favorite holiday or vacation destination.

It should be recognized that the terms used to identify the data fields illustrated in FIG. 3 are merely descriptors, and that the actual data fields are related to the descriptors. For instance, the actual data fields associated with the descriptor of gender 310 are "male" and "female". The actual data fields associated with the descriptor of marriage status 315 may include "married", "single" and "widow". Therefore, upon providing information when registering that the player is a single female, her name can be included in those two data fields 315, 310 in the database 300.

Furthermore, players may purposefully join together to create a player created data field that is in the nature of a team of players (note team A 355 and team B 360 in FIG. 3). Thus players may use this sign-up option to establish a uniquely limited group and provide an opportunity to share a bonus award among close friends. For example, co-workers or members of a club could sign up as a team and all be part of an exclusive player group.

As mentioned above, these data fields specifically include the names or other identifier for players having the attribute or interest defined therein in the database 300. As a further example, and describing how the casino player reward system may determine and distribute a bonus award, all players whose favorite soccer team is Manchester United will have their names included in the data field for that particular interest.

As described, the data fields are established based on information provided by the players who patronize a casino operator's establishment. When a player first registers with the casino operator, he or she may provide as much personal interest information as desired. It can be appreciated that in one embodiment the greater the amount of personal information that is provided, the more opportunities there are for the player to have his or her name included in data fields. This then creates more opportunities for the player to qualify for a bonus award. Alternatively, it is possible that a limited number of data fields may be eligible to qualify a player for an award. The player may select which date field as an award qualifier.

If, at some point, this data field is chosen, either randomly or non-randomly, to receive a bonus or jackpot, the players whose names are in this data field may be eligible to share in the bonus or jackpot. If other players that share the same data field are playing at other gaming machines when the bonus is triggered, the system may signal to those gaming machines to present notification that the player has qualified to share in a bonus or jackpot. In addition, or in conjunction with a video notification, such as a video clip, the speakers of those specific gaming machines may present an audio notification. If the data field match which generated the award comprises a common sport team, then the video clip may comprise a video clip of the team in play and the audio clip may comprise a fight song or cheer associated with the team.

Award to Players Based on Personal Interest Information

The casino operator may utilize the data fields representing categories of personal interest information in the database in a great variety of ways to pay bonus awards to its players. As an advantage to this system of providing awards, players are encouraged to play and become part of player groups. Player groups build unity and a team mentality amongst players which may enhance the gaming experience for a player.

One approach for awarding a bonus to a player contemplates the sharing of a bonus award among players that have a common interest and/or attribute and are thus in or share a common data field as the database. This may occur even though all players in the player group are not currently playing. Thus, the casino operator may set up its player reward system in a general manner whereby a player playing a gaming machine triggers the award of a bonus or jackpot in accordance with presently known procedures. The initial triggering of the award of a bonus or jackpot may occur in any manner. The bonus server then may communicate with the database in the player tracking server and identify one or more a data fields that includes the name of the triggering player or identify with which player groups the player is associated. The bonus server may further identify the names or player identifications of the other players in that data field who then share in the bonus award. The bonus or jackpot pool is then shared among that group of players included in chosen data field. In an alternate embodiment, only certain personal interest information groups are selected and hence, only certain player groups with which the player is associated will share in the award. This selection of personal information groups may be made based on whether a particular sport is in season. For example, during American football season only a player's favorite football team is selected such as the New York Jets. During hockey season, a player's favorite hockey team is selected such as the New York Islanders.

It is within the scope of the invention that the bonus or jackpot pool may be shared equally, or alternatively, a greater portion of the bonus or jackpot award may go to the player who triggers the award of the bonus or jackpot and the remaining players in the data field may share the remaining portion of the bonus or jackpot pool in either equal or unequal amounts.

Even with this more targeted approach to distributing an award amongst members of a player group, the casino operator may implement the awarding of bonuses or jackpots in a variety of manners. For instance, it is contemplated that the casino operator may desire to reward its more valued players at particular times with bonuses or jackpots. Those players who are categorized as the most valued players, perhaps described by the casino operator as "gold members", may be the players specifically chosen to receive an award. In a related approach, the players that are categorized in various lower levels of value (i.e., "silver members", "bronze members", etc.) may share in a bonus award, but receive a lower amount of the bonus pool than gold members. As an example, Harrah's Total Rewards program has as its lowest level Gold, its middle level platinum and its highest level diamond.

Selecting which Player Groups Receive Awards

As stated above, another approach contemplated by the player reward system of the present invention is to specifically or randomly choose a personal interest data field for the receipt of an award of a bonus or jackpot. For example, during sporting seasons different player interest data field may be designed as capable of shared award status. Alternatively, other days or dates may warrant that other personal interest data fields qualify those members for shared awards. Players may also designed a limited number of data field(s) which will quality the player for awards. Hence, any manner of determining which personal interest data fields may be utilized may be adopted for use by the present invention.

Events that Trigger Award

In addition, the casino operator may configure any triggering event for the bonus server to award a bonus or jackpot. In one embodiment, an award may be made at a particular time. It is also contemplated that the award may occur in response to a game outcome generated by a player in the player group, such as a particular poker hand or reel outcome. In one embodiment the award is in response to a random number generation and hence the award occurs randomly, such as in a mystery Jackpot®. In other embodiments, any type event may trigger the award, which may then be shared with other players based on one or more player groups. The award may be granted at a cash desk, cage, by granting player points, awarding a player account, such as a cashless account, awarding redeemable or non-redeemable credits, vouchers, comps, merchandise delivered directly or via mail, or any other means for providing an award to a player.

Alternative Uses of Personal Interest Information

Another approach may incorporate a marketing event, such as a Ladies Night, which is used in a variety of entertainment settings to attract the presence of players, such as a ladies night, or a seniors night. In this approach, the bonus server may be configured to plan the timing and/or sharing of an award, such that the award is shared by all females or seniors who are participating in gaming activity at the casino at the time of the award. This would encourage game play since the player, if part of the player group receiving the award would receive a portion of the award, regardless of whether they received a winning game outcome.

In a similar approach, the casino operator may promote a "singles" event for unmarried players. To encourage interaction among unmarried players, perhaps with specific attention to a certain age group, the bonus server or other device may be configured to determine when a bonus may be awarded to a player. When that bonus is triggered, other players of the opposite gender and within the same age range, as identified by the player preference data, as the triggering player may share in a portion of the bonus award. The display screen and speakers of the gaming machines on which qualifying players are playing at the time of the award of the bonus may not only provide video and audio notification of the award, but also may identify the triggering player and his or her location to allow those sharing in the award to find the triggering player if desired. Social events may also be considered as part of the award.

Determining which Members of a Player Group are Eligible for Award

The system may be implemented in a manner in which players may qualify to receive a portion of an award only if they are active players. The term active player may be defined in any manner to include any sub-group of players in a player group or all players within the player group selected to receive the award. In one embodiment, only players that are currently wagering (logged into the player tracking system) are designated as active players. Alternatively, an award may be made regardless of whether the player is participating in gaming activity at the casino at the time the award is triggered. It is also contemplated that active players may be defined as players which, although not currently wagering, have wagered within some recent time period, such as hours, days, weeks or months. Alternatively, an award may be made to players in the casino, such as those eating or visiting, although not actively gaming. It is contemplated an award may be made to an absentee player who is a valued player who is categorized in the highest value categories, such as gold members. In other embodiments, an active player may be defined as a player who has not won recently.

Example Method of Operation

Figure 4A:
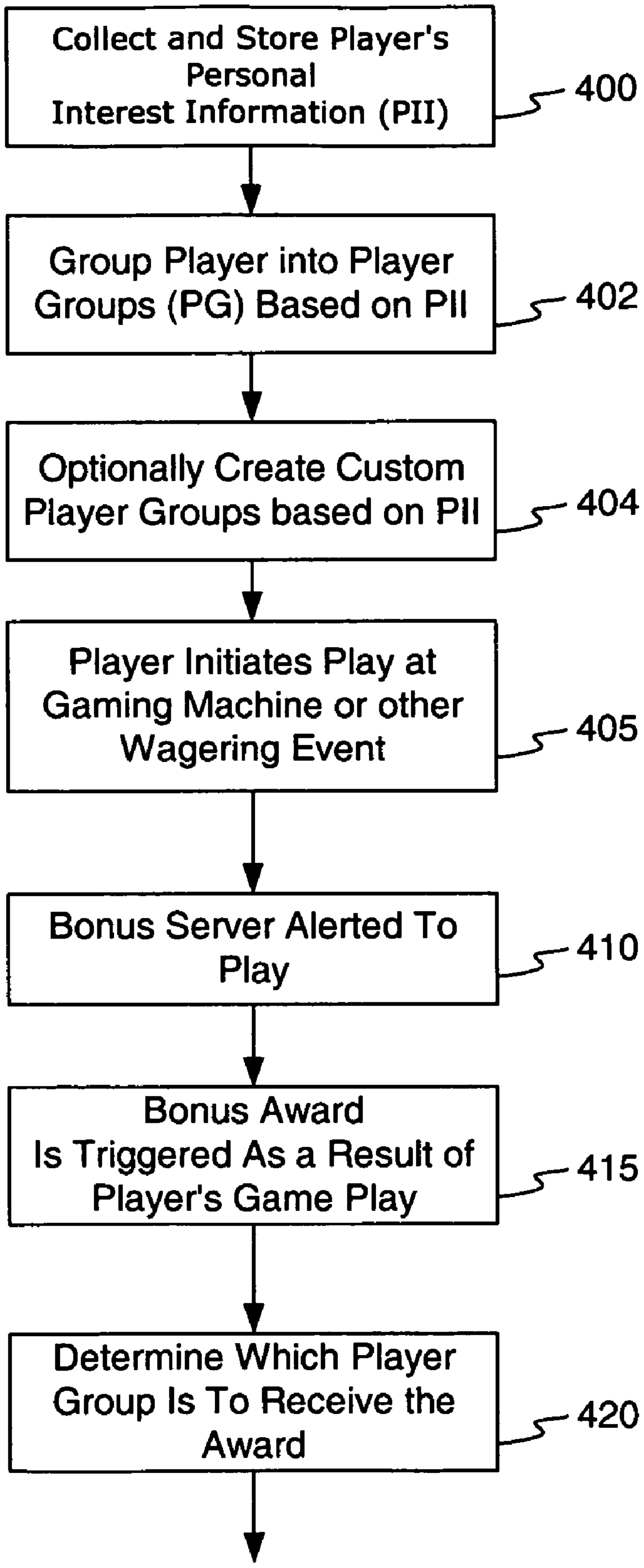
FIGS. 4A and 4B illustrate an operational flow diagram of an exemplary method of operation of the present invention.

The implementation of the method of the invention is illustrated in an operational diagram presented in FIG. 4. This is but one possible method of operation and, as such, it is contemplated that other methods of game play may be realized without departing from the scope of the claims that follow. Referring initially to step 400, a player may register to be eligible for the shared awards by providing personal interest information which is collected and stored in the database in the manner previously described. At step 402, the player personal interest information is grouped into one or more player groups in response to their personal interest information. For example, depending on the player's preferences or characteristics, the player may be placed in a particular player group with other players who, for example, like the same team and may be placed into one or more other player groups with other players who share similar personal interest information.

At a step 404, the casino or other entity optionally creates a custom player group based on the personal interest information or the request of the player. For example, if the player wants to start their own player group, then at this step, a new player group may be created.

Thereafter, at a step 405, the player may initiate play at a gaming machine or initiate another wagering event. It is contemplated that as part of the play, the player would register with a game network thereby allowing the game network to log the player into the game network. This allows the bonus server and player tracking server to track the game play and/or track the player. Likewise, the bonus server, at step 410, may be alerted that play is occurring and that game outcomes or other game events may trigger an award of the bonus. The bonus server preferably has been configured in desired fashion to determine if a bonus is to occur based on the time of play at the machine, a game outcome, the amount wagered at the machine, or any other event.

As any number of different events may trigger the award depending on the configuration of gaming system, it is assumed that at some point an award triggering event occurs. Thus, at step 415, a bonus award is triggered in accordance with procedures described above.

At a step 420, the system determinates which player group is to receive the award. This involves selecting one or more categories of personal interest information which are eligible to have the award distributed. As discussed above, this may occur in numerous different ways. While FIG. 4 illustrates this step as occurring at this time in the operational flow diagram, it can be appreciated that the determination as to which data field (player group) is to be rewarded with a bonus may have been preprogrammed into the bonus server along with the triggering information.

Figure 4B:
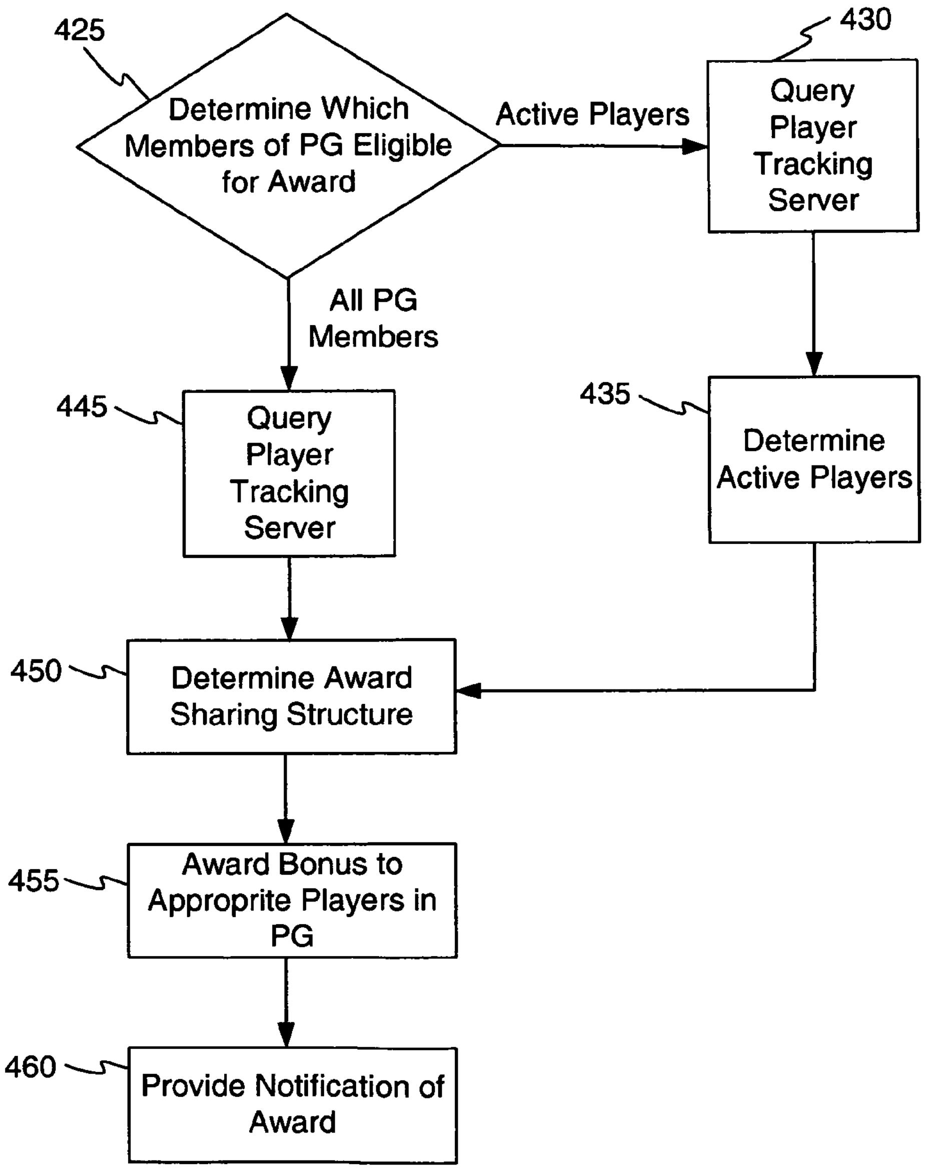

Turning now to FIG. 4B, at a step 425 an inquiry occurs to determine which members of the player group are eligible for the award. It is contemplated that in this embodiment all members of the player group may be eligible, or only active players. If only active players are eligible, then the operation advances to step 430 where the system queries the player tracking server to determine, at step 435, which players are active players. The determination of active players could include reading which players have credits in a machine and have their player card inserted. After step 435, the operation advances to step 450, which is discussed below in more detail.

Alternatively, if at step 425 it is determined that all members of the one or more selected player groups are active players and hence entitled to share in the award, then the operation advances to step 445. Step 445 is similar to step 430 in that the player tracking server or other server is queried to determine which players are part of the selected player group.

Step 445 also represents the circumstance where a portion of the bonus or jackpot is awarded to players in the qualifying data field who are not present at the casino and playing at the time the bonus is triggered. In this circumstance, the award to those players not present may be made in an appropriate manner, such as crediting a player's account in the amount of the bonus award.

At a step 450, the system determines the award sharing structure, i.e. the method of dividing the award amongst the active members of the player group. It can be appreciated that the casino operator, as earlier described, may pay the award equally to all of those players, or alternatively, may pay a greater portion of the bonus amount to the triggering player, while the remaining players share in the remaining portion of the award. It is also contemplated that the players may be awarded a portion of the award based on the amount they contributed to the award or some other related division of the award, such as but not limited to, amount of time played, or total lost.

Thereafter, at a step 455, the system distributes the award to the players designated to share in the award. This may comprise providing credits to their account, or credits on the machine/table they are currently wagering. Other forms of award may be provided, such as comps, show tickets and the like. At a step 460, the system provides notification of the award to the members receiving the award. This may occur in any manner including on screen notification, audio announcements, e-mail, or personal notification.

In summary, numerous advantages and benefits result from the implementation and operation of the casino player reward system of the present invention. By establishing a system wherein casino players have an opportunity to share in an award of a bonus or jackpot, their interest and excitement is heightened. This leads to more visits to the casino and increased gaming activity, which benefits the casino operator. In addition to the increased number of award opportunities, the chance to share an award with players having similar interests and/or attributes promotes additional enthusiasm for the gaming experience.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment disclosed herein was chosen and described to provide the best illustrations of the principles of the invention and its practical application to thereby to enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally and equitably entitled.

What is claimed is:

1. A system for rewarding members of a player group with a shared award in response to play by an award winner during play of a wagering game, the system comprising:

a database configured to store personal interest information regarding a plurality of players, wherein the personal interest information places each of the plurality of players into one or more player groups;

an identification element, having identification data associated therewith, the identification element used to identify each of the plurality of players when participating in gaming activity;

one or more computer servers configured to:

determine the identity of at least one player who is an award winner by randomly selecting the at least one player from the plurality of players;

determine at least one player group to which the award winner belongs by;

determine a winning player group by randomly selecting the winning player group from the at least one player group to which the award winner belongs;

determine at least one other player to share the award by randomly selecting the at least one other player from the winning player group;

distribute at least a portion of the award to the award winner; and distribute at least a portion of the award to the at least one other player.

2. The system of claim 1, wherein the database comprises a plurality of data fields, and wherein each data field represents a category of personal interest information and identification data for players with the personal interest information defined by the data field.

3. The system of claim 2, wherein the one or more player groups include a private group of players.

4. The system of claim 1, wherein the award is triggered in response to a particular game outcome.

5. The system of claim 1, wherein the award is shared among only active players.

6. The system of claim 1, wherein only certain player groups are eligible to share in the award.

7. The system of claim 1, wherein the grant of award occurs at a random time.

8. The system of claim 1, wherein the award is shared amongst only player group members who are playing at the time that the award is awarded.

9. The system of claim 1, wherein the award is distributed in unequal amounts to members of the player group.

10. The system of claim 9, wherein a greater portion of the award is distributed to the award winner.

11. The system of claim 1, wherein the award is a progressive jackpot.

12. The system of claim 11, wherein the award is a mystery jackpot.

13. The system of claim 1, wherein the award is a fixed sum of money.

14. A computerized method of rewarding two or more players of a wagering game with an award, the method comprising:

causing a processor to collect and store personal interest information regarding two or more players in a database;

establishing an award fund to be awarded to an award winner;

randomly selecting one of the two more players to be the award winner;

randomly selecting at least one category of personal interest information associated with the award winner from among a plurality of categories of personal interest information associated with the award winner;

randomly selecting one or more other players to share the award fund from the at least one category of personal interest information; and sharing the award fund among the randomly selected one or more players also associated with the at least one category of personal interest information.

15. The computerized method of claim 14, wherein the database comprises a plurality of data fields, and wherein each data field represents a category of personal interest information and player identifier.

16. The computerized method of claim 15, wherein the player purposefully creates a data field in the database that includes other specifically chosen players.

17. The computerized method of claim 14, wherein the award of the award occurs randomly and the award is shared with players with common personal interest information.

18. The computerized method of claim 14, wherein the award to the one or more players occurs at a random time.

19. The computerized method of claim 14, wherein the award is shared among only players who are playing at the time that the award is made.

20. The computerized method of claim 14, wherein the award is shared equally among players within the qualifying data field.

21. The computerized method of claim 14, wherein a greater portion of the award is distributed to the player who triggers the award.

22. The computerized method of claim 14, wherein the award is a progressive jackpot.

23. The computerized method of claim 22, wherein the award is a mystery jackpot.

24. A system for rewarding members of a player group with a shared award in response to play by an award winner during play of a wagering game, the system comprising:

a database configured to store personal interest information regarding a plurality of players, wherein the personal interest information places each of the plurality of players into one or more player groups;

an identification element, having identification data associated therewith, the identification element used to identify each of the plurality of players when participating in gaming activity;

one or more computer servers configured to:

determine the identity of at least one player who is an award winner by randomly selecting the at least one player from the plurality of players, a plurality of categories of personal interest information associated with the award winner;

determine at least one player group to which the award winner belongs by randomly selecting at least one category of personal interest information associated with the award winner, the one player group having the randomly selected category of personal interest information in common;

determine a winning player group by randomly selecting the winning player group from the at least one player group to which the award winner belongs;

determine at least one other player to share the award by randomly selecting the at least one other player from the winning player group;

distribute at least a portion of the award to the award winner; and distribute at least a portion of the award to the at least one other player.

* * * * *